June 19, 1923.
W. M. RAND ET AL
METHOD OF SPLITTING CORD TIRES
Filed June 28, 1922
1,459,693
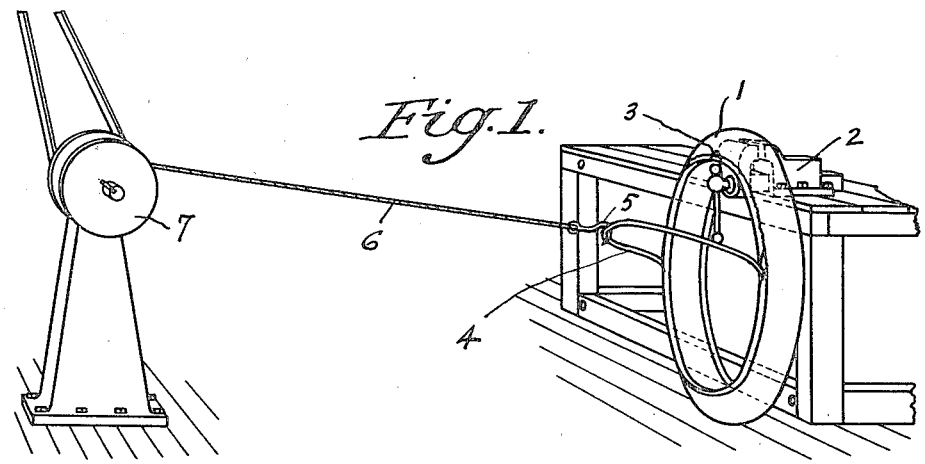
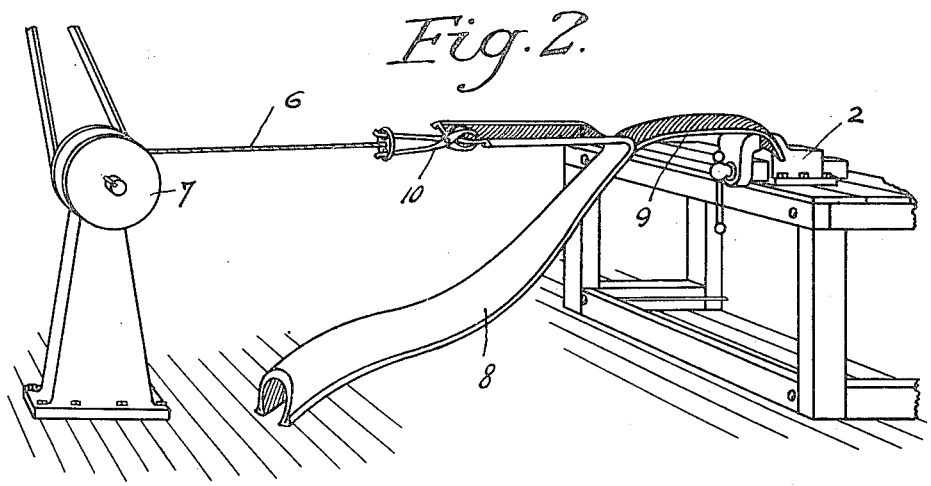
INVENTORS
WILLIAM MARCHANT RAND
IRVIE C. BROOK
FREDERICK CAMERON BUTLER
By Marks & Clerk
Att'ys Patented June 19, 1923.

1,459,693

UNITED STATES PATENT OFFICE.

WILLIAM MARCHANT RAND, IRVIE C. BROOK, AND FREDERICK CAMERON BUTLER, OF VANCOUVER, BRITISH COLUMBIA, CANADA.

METHOD OF SPLITTING CORD TIRES.

Application filed June 28, 1922. Serial No. 571,515.

*To all whom it may concern:*

Be it known that we, WILLIAM MARCHANT RAND, IRVIE C. BROOK, and FREDERICK CAMERON BUTLER, all subjects of the King of Great Britain, residing at the city of Vancouver, in the Province of British Columbia, Canada, have invented certain new and useful Improvements in Methods of Splitting Cord Tires, of which the following is a specification.

Our invention relates to a method of splitting cord tires, and the object of our invention is to devise a method whereby it is economically possible to split old or junk cord tires circumferentially without damaging the lower cords so that the entire inner half of the tire may be recovered intact and used to great advantage for shoes and inner linings in repair work, the method enabling the operation to be effected at practically no expense so that material of highly superior character is rendered available for repairing purposes at a fraction of the cost demanded for material which is specially manufactured and sold for shoes and inner linings.

The method is illustrated by the accompanying drawing in which—

Fig. 1 is a perspective view showing the first step of the method.

Fig. 2 is a perspective view illustrating the splitting of the casing.

Similar figures of reference indicate similar parts in the views.

It will be understood that the cord tires above referred to have each a metal ring embedded in the bead on each side of the casing. In the first step of the method the casing 1 is held firmly by gripping one wall between the jaws of a vise 2 and a cut 3 is made in the bead on the opposite side to expose the metal ring 4 after which a hook 5 is inserted in the cut to hook over the ring. The hook is connected to a cable 6 which passes round the drum of a winch 7, so that when the winch is operated under power to rotate the drum the ring 4 is torn out of the bead and clear of the casing, but it should be particularly noted, the removal of the ring in this manner does not disturb the fabric strip or selvage which surrounds the bead and holds the ends of the cords so that the tearing out of the metal ring does not affect the cord structure. The casing is then reversed and the metal ring on the opposite side removed in the same manner, after which the casing may be cut through transversely at any point, which can be done now that the rings have been removed, so that there remains a length of the casing of cord construction, as indicated at 8 in Fig. 2.

The next step is to divide the casing circumferentially. On viewing the cross section of a cord tire it will be seen that it consists of two main thicknesses or layers composed of cords according to the designed construction, that is to say, if it is what is termed a 10-cord tire there are five cords in the upper half of the casing and five in the lower half, the upper cords being laid diagonally on the lower ones, and it will be noted that the ends of the cords, referring now to the lower ones, are laid under a fabric strip or selvage, as indicated by the numeral 9 in Fig. 2. The two layers are therefore separated sufficiently at one end of the length 8 to enable the end of the lower layer to be gripped in the vise and the end of the upper layer to be gripped by a pair of tongs or pliers 10 attached to the end of the cable 6 after which the winch is started, pulling back on the upper layer so that it is pulled apart and separated from the lower one and thus splitting the casing circumferentially without damaging the cord structure of the lower layer since, during the pulling operation just mentioned, the cords are held firmly by the fabric selvage and it is due to the maintenance of this selvage intact until the casing is split that the splitting operation can be successfully effected as otherwise, if the selvage were removed or destroyed prior to the pulling back of the upper layer, the lower cords would be torn away along with the upper layer when the winch is operated so that the lower layer would be rendered useless for the purpose in view.

By maintaining the strip or selvage in its normal position until the splitting operation is completed a material for shoes and inner linings is obtained at small cost and convenience from old discarded tires which is invaluable and easily supersedes the shoe and lining material manufactured and sold for tire repair work.

What we claim as our invention is:—

1. A method of splitting cord tires without damaging the lower cords which consists in removing the metal rings from the beads while leaving intact the connection of the ends of the lower cords and the selvage with which the said ends are bound, cutting the casing transversely to transform it into one length, and then pulling apart the upper layer of cords from the lower layer, the end of the lower layer being rigidly secured during the pulling operation.

2. A method of splitting cord tires without damaging the lower cords which consists in forcibly tearing out sidewise the metal rings from the beads while leaving intact the connection of the ends of the lower cords and the selvage under which said ends are laid, cutting the casing transversely to transform it into one length, separating the upper and lower layers of cords at one divided end, and then pulling back the upper layer while rigidly holding the end of the lower layer.

In testimony whereof we affix our signatures at Vancouver, B. C. this 16th day of June, 1922.

WILLIAM MARCHANT RAND.
IRVIE C. BROOK.
FREDERICK CAMERON BUTLER.